Patented Sept. 21, 1943

2,329,706

UNITED STATES PATENT OFFICE 2,329,706

CELLULOSE ESTERS

Camille Dreyfus, New York, N. Y., and Mervin E. Martin, Cumberland, Md., assignors to Celanese Corporation of America, a corporation of Delaware No Drawing. Application July 29, 1942, Serial No. 452,788

9 Claims. (Cl. 260—230)

This invention relates to improvements in the production of organic esters of cellulose and relates more particularly to the production of cellulose acetate or other cellulose esters of a relatively low degree of esterification.

An object of our invention is the production of organic esters of cellulose of a relatively low degree of esterification.

Another object of our invention is the production of cellulose esters having an improved stability and heat resistance.

Yet another object of our invention is the production of cellulose esters which are suitable for use in molding operations.

A further object of our invention is the production of cellulose esters which require the use of little or no plasticizing agents to yield satisfactory results when subjected to molding operations.

Other objects of our invention will appear from the following detailed description.

In the process of preparing organic esters of cellulose, the esterification of the cellulose is usually carried out by treating cellulose with an organic acid anhydride in the presence of a catalyst such as sulfuric acid and an organic acid diluent, or solvent, for the ester of cellulose being formed. The esterified cellulose is obtained in the form of a viscous, homogeneous solution in the organic acid diluent to which water is added in amounts sufficient to convert any organic acid anhydride remaining into the corresponding acid. The cellulose ester, usually after the addition of a further quantity of water, is permitted to hydrolyze or ripen to develop the desired solubility characteristics. Water and/or other non-solvent for the cellulose ester is then added in sufficient amounts to precipitate the cellulose ester from solution. The cellulose ester is finally washed with water, to free it of acids as much as is possible.

In the preparation of cellulose acetate, in accordance with the above process, the cellulose with or without a pre-treatment with organic acids, or organic acids containing some sulfuric acid, is usually acetylated by treatment with acetic anhydride and a catalyst, such as sulfuric acid, in the presence of glacial acetic acid as a solvent for the cellulose acetate formed. The sulfuric acid catalyst is normally present in amounts of from 9 to 15%, or even 20%, on the weight of the cellulose. Part of this sulfuric acid may be introduced during the pretreatment which is designed to render the cellulose more reactive. When the acetylation is completed, water is stirred into the reaction mixture to convert the excess acetic anhydride to acetic acid, and, after the addition of a further amount of water, the resulting solution of cellulose acetate in acetic acid, containing the sulfuric acid employed as the catalyst, is permitted to stand and to ripen until the desired solubility characteristics are reached. During this ripening period, not only are acetyl groups split off, but in addition, combined sulfuric acid is split off. When the desired solubility characteristics are reached, further ripening is halted and the solution is treated with a large excess of water or other non-solvent to precipitate the cellulose acetate. The precipitated cellulose acetate is washed with water to remove as much acid and other soluble materials as possible. After washing, the cellulose acetate is subjected to a stabilizing treatment, usually by heating it in suspension in very dilute sulfuric acid, with the object of still further reducing its content of combined sulfuric acid and other sulfur compounds. The latter impair the stability of the cellulose acetate and impart thereto a tendency to decompose, degrade and/or discolor. The degree of stability is measured by the acidity developed when a sample of cellulose acetate is treated with distilled water under conditions of elevated temperature and pressure for a predetermined period of time. The development of excessive acidity denotes a product of unsatisfactory stability.

During the preparation of cellulose acetate by the above method, the hydrolysis or ripening is usually interrupted at the point where the cellulose acetate has an acetyl value of, for example, 53 to 56%, calculated as acetic acid, and the cellulose acetate is precipitated from solution. Cellulose acetates of this degree of esterification find extensive commercial application in the manufacture of yarns, films, foils, plastic masses and the like. Attempts have been made to produce cellulose acetates of a lower degree of esterification by prolonging the ripening or hydrolysis beyond the period employed for obtaining cellulose acetates of an acetyl value of 53 to 56%, but it has been found that the cellulose acetates thus obtained do not possess a sufficiently high degree of stability to be of wide utility.

We have now discovered that cellulose acetates, as well as other organic esters of cellulose, having a relatively low degree of esterification, as compared to those esters usually employed commercially, may be obtained in a highly stable form requiring little or no stabilization treatment. These valuable cellulose esters may be obtained if, after an esterification reaction, as described, the cellulose acetate so produced is ripened at an elevated temperature in the presence of a substantially reduced amount of catalyst in a plurality of stages. Preferably, said ripening process comprises at least four stages, the ripening being allowed to proceed in the final ripening stage until the ripened cellulose acetate has reached the desired acetyl value, whereupon ripening is halted and the cellulose acetate precipitated from solution.

In accordance with the process of our invention, when ripening in four stages, the amount of catalyst present for the first ripening stage is reduced, by the addition of a suitable neutralizing agent, to from 7 to 10% on the weight of the original cellulose, whereupon water for ripening in an amount of from 20 to 35% on the cellulose is added and the ripening is carried out at a temperature of about 40 to 55° C. for from 1 to 4 hours. The neutralizing agent added for the first ripening stage may be added together with the water for ripening. For the second stage, more neutralizing agent is added and the amount of catalyst present is further reduced to about ½ to 2% on the cellulose. The temperature is raised to 55 to 65° C., from 50 to 100% of water is added and the cellulose acetate ripened for 1 to 4 hours. For the third stage, the amount of catalyst present may remain unchanged, water is added in an amount of 50 to 100% on the weight of the cellulose and ripening is conducted from 1 to 4 hours at 60 to 90° C. More water is added for the fourth stage, e. g., from 50 to 100% on the cellulose, making a total of 170 to 335%, and the temperature may be maintained the same as for the third stage, but, more preferably, raised to from 70 to 100° C., and ripening is continued until the cellulose acetate has hydrolyzed or ripened to the desired degree. While, in accordance with our process, ripening may be halted when the acetyl value of the cellulose acetate is still in the range normally employed commercially, i. e., 53 to 56%, the ripening is preferably continued until the cellulose acetate has ripened to a relatively low degree of esterification, for example, to an acetyl value of from 40 to 45%, and particularly 40 to 43%, calculated as acetic acid. Cellulose acetates of this degree of acetylation and possessing the high stability which we obtain in accordance with our novel process were hitherto unknown. While the ripening process of our invention has been described particularly as a four stage ripening process, it is to be understood, of course, that highly stable cellulose esters of a relatively low degree of esterification may also be obtained when ripening is carried out in five, six or more stages. When ripening in more than four stages, the total water for ripening may be from 100 to 300% or 335% on the weight of the original cellulose.

The water for ripening may be added as such or, more advantageously, may be added in the form of a dilute solution of acetic acid to avoid any local precipitation of the cellulose acetate. The neutralizing agent for the catalyst may be added together with the water for ripening, particularly if the latter is added in the form of a dilute solution of acetic acid, or in solution in glacial acetic acid, or it may be added separately in powder form.

The neutralizing agent employed may be a salt of magnesium or calcium, such as magnesium acetate, calcium acetate, magnesium carbonate, or calcium carbonate. Zinc acetate, zinc oxide, or the oxides, carbonates or hydroxides of aluminum, barium, copper, lithium and strontium, as well as an organic acid salts of these metals may also be employed as the neutralizing agent. Mixtures of any two or more of the compounds may also be employed as the neutralizing agent. The neutralizing agent preferably employed in accordance with this invention comprises a mixture of magnesium acetate and calcium acetate.

The cellulose may, prior to acetylation, be pretreated with acetic acid or formic acid, or mixtures of these acids to render the cellulose more reactive. The acids may be used in small amounts, for example, 1 to 50% on the weight of the cellulose, or in much larger quantities, for example, 100%, 200%, or even 300% on the weight of the cellulose, and may contain a small quantity of sulfuric acid, for instance, ½ to 1 or 2% on the weight of the cellulose. The pretreatment is preferably allowed to go on for some hours, for example, overnight, though much sorter periods may be used when sulfuric acid is present. The pretreated cellulose is then treated with acetic anhydride and sulfuric acid in appropriate amounts to bring about acetylation.

The cellulosic materials to be esterified in accordance with our process may be any suitable form of cellulose or cellulose derivative. It may be cotton, cotton linters, wood-pulp, regenerated cellulose, or other cellulosic material obtainable from various other sources such as grasses, straws, hulls and the like.

In order further to illustrate our invention, but without being limited thereto, the following examples are given:

Example I 170 parts by weight of a mixture comprising 65% by weight of cotton linters and 35% by weight of wood pulp cellulose are acetylated with 350 parts of acetic anhydride, 630 parts of acetic acid and 25 parts of sulfuric acid. The time of acetylation is 1½ hours during which time a peak temperature of 42° C. is reached. After acetylation is completed, sufficient water to destroy any excess acetic anhydride is added to the reaction mixture.

Sufficient neutralizing agent is added to neutralize part of the sulfuric acid, leaving 8.68% on the weight of the cellulose. Water for ripening is added with the neutralizing agent in an amount equal to 23.5% on the cellulose, the temperature of the mixture is raised to 50° C. over a period of 1½ hours and is held at this temperature for an additional 1½ hours. The neutralizing agent employed comprises a mixture of magnesium acetate and calcium acetate obtained by reacting calcined dolomite in dilute acetic acid to form said acetates, the resulting clear aqueous solution being employed as the neutralizing agent.

At the end of the first ripening stage further neutralizing agent is added to reduce the sulfuric acid to about 1% on the cellulose and a further addition of 58.5% of water is made. The temperature is raised to 60° C. and the solution is ripened for 3 hours. For the third stage the water is increased by adding another 58.8% on the cellulose, the sulfuric acid remaining the same, and ripening is continued for 3 hours at 60° C. At this point another 58.8% of water is added, making a total of 200% on the cellulose, the temperature is raised to 80° C. and ripening continued for 71 hours, making a total ripening time of 80 hours. At the end of this period the cellulose acetate has an acetyl value of 42.4%, calculated as acetic acid. The cellulose acetate is precipitated from solution by the addition of a large amount of water, and is washed and dried. The cellulose acetate has a high degree of stability, is low in combined sulfates and has a high degree of heat resistance.

*Example II*

Cellulose is acetylated in the manner described in Example I.

After the excess acetic anhydride is destroyed by the addition of water, neutralizing agent, prepared as in Example I, is added in an amount sufficient to reduce the sulfuric acid to 7.6% on the weight of the cellulose and 23.5% of water is added with the neutralizing agent for ripening. The temperature is raised to 50° C. over a period of 1½ hours and maintained at this temperature for an additional 1½ hours. At this point 58.8% of water is added together with sufficient neutralizing agent to reduce the sulfuric acid to 1.78% on the cellulose. The temperature is raised to 60° C. and the second stage ripening continued at this temperature for 3 hours. For the third stage another 58.8% of water is added and ripening is continued for 3 hours at 60° C. with no change in the amount of sulfuric acid present. For the fourth stage, another 58.8% of water is added, making a total of 200%, the temperature is raised to 90° C. and ripening is continued for 15 hours, making a total ripening time of 24 hours. At this point the cellulose acetate has an acetyl value of 42.9%. Ripening is halted and the cellulose acetate precipitated by the addition of a large amount of water. The cellulose acetate has an excellent stability as well as heat resistance.

*Example III*

Cellulose is acetylated as described in Example I.

After the excess acetic anhydride is destroyed by the addition of water, neutralizing agent, prepared as in Example I, is added in an amount sufficient to reduce the sulfuric acid to 8.46% on the cellulose and 23.5% of water is added with the neutralizing agent for ripening. The temperature is raised to 50° C. over a period of 1½ hours and held at this temperature for an additional 1½ hours. Water is added at this point in an amount of 58.8%, and with this water is added sufficient neutralizing agent to reduce the sulfuric acid to 0.68% on the cellulose. The temperature is raised to 60° and held at this temperature for 3 hours. At the end of this second stage 58.8% more of water is added for the third ripening stage, and ripening is continued for 3 hours at 60° C. Another water addition of 58.8% is made, making 200% in all, the temperature raised to 90° C. and the ripening continued for 45 hours, making a total ripening time of 54 hours. The cellulose acetate has an acetyl value of 42.7% at the end of this period and is precipitated from solution by the addition of an excess of water. The cellulose acetate has an excellent degree of stability.

While our invention is particularly described in connection with acetylation of cellulose employing sulfuric acid as catalyst, other catalysts such as, for example, phosphoric acid, or mixtures of phosphoric acid and sulfuric acid may be used as well. Preferably we employ sulfuric acid alone without any mineral acid present during either acetylation or ripening. In a similar way, employing the proper esterifying agent or agents, other cellulose esters may be prepared, for example, the cellulose esters of propionic, butyric, or similar acids, or mixed esters, for example, cellulose acetate-propionate or cellulose acetate-butyrate.

The organic ester of cellulose of a relatively low degree of esterification prepared in accordance with our invention may be employed for the production of textile materials such as yarns, threads, filaments, fibers, and the like, molding compositions, plastic masses, as well as other commercial and technical materials. The organic esters of cellulose are especially valuable in that they are of high stability, thus requiring no stabilizing treatment, are low in sulfate and have a high heat resistance. Not only do they have these desirable properties but they likewise may be subjected to molding operations under heat and pressure and require the addition of little or no plasticizers in order to obtain a molded object of excellent characteristics.

It is to be understood that the foregoing detailed description is given merely by way of illustration and that many variations may be made therein without departing from the spirit of our invention.

Having described our invention, what we desire to secure by Letters Patent is:

1. Process for the preparation of organic acid esters of cellulose of increased stability, which comprises esterifying cellulose by means of a lower fatty acid anhydride in the presence of an inorganic acid catalyst selected from the group consisting of sulfuric acid and phosphoric acid, and ripening the lower fatty acid ester of cellulose so produced to the desired solubility characteristics in at least four stages, a portion of the catalyst present in the esterification mixture being neutralized in at least each of the first two stages of ripening by the addition thereto of a neutralizing agent, selected from the group consisting of magnesium, calcium, zinc and aluminum compounds, and water being added in all of the stages of ripening.

2. Process for the preparation of organic acid esters of cellulose of increased stability, which comprises esterifying cellulose by means of a lower fatty acid anhydride in the presence of an inorganic acid catalyst selected from the group consisting of sulfuric acid and phosphoric acid, and ripening the lower fatty acid ester of cellulose so produced to the desired solubility characteristics in at least four stages, a portion of the catalyst present in the esterification mixture being neutralized in at least each of the first two stages of ripening by the addition thereto of a neutralizing agent, selected from the group consisting of magnesium, calcium, zinc and aluminum compounds, and water being added in all of the stages of ripening, the temperature of the final ripening stage being higher than the temperature of the prior ripening stages.

3. Process for the preparation of cellulose acetate of increased stability, which comprises acetylating cellulose by means of acetic anhydride in the presence of acetic acid as solvent and sulfuric acid as catalyst, and ripening the cellulose acetate so produced to the desired solubility characteristics in at least four stages, a portion of the catalyst present in the esterificaion mixture being neutralized in at least each of the first two stages of ripening by the addition thereto of a neutralizing agent, selected from the group consisting of magnesium, calcium, zinc and aluminum compounds, and water being added in all of the stages of ripening.

4. Process for the preparation of cellulose acetate of increased stability, which comprises acetylating cellulose by means of acetic anhydride in the presence of acetic acid as solvent and sulfuric acid as catalyst, and ripening the cellulose acetate so produced to the desired solubility characteristics in at least four stages, a portion of the catalyst present in the esterification mixture being neutralized in at least each of the first two stages of ripening by the addition thereto of a neutralizing agent, selected from the group consisting of magnesium, calcium, zinc and aluminum compounds, and water being added in all of the ripening stages, the temperature of the final ripening stage being higher than the temperature of the prior ripening stages.

5. Process for the preparation of organic acid esters of cellulose of increased stability, which comprises esterifying cellulose by means of a lower fatty acid anhydride in the presence of an inorganic acid catalyst selected from the group consisting of sulfuric acid and phosphoric acid, adding a neutralizing agent, selected from the group consisting of magnesium, calcium, zinc and aluminum compounds, to the esterification mixture at the completion of the esterification to reduce the amount of catalyst present therein, and ripening the lower fatty acid ester produced to the desired solubility characteristics in at least four stages, additional neutralizing agent being added in at least the first of the ripening stages to further reduce the amount of catalyst and water being added in all of the stages of ripening.

6. Process for the preparation of organic acid esters of cellulose of increased stability, which comprises esterifying cellulose by means of a lower fatty acid anhydride in the presence of an inorganic acid catalyst selected from the group consisting of sulfuric acid and phosphoric acid, adding a neutralizing agent, selected from the group consisting of magnesium, calcium, zinc and aluminum compounds, to the esterification mixture at the completion of the esterification to reduce the amount of catalyst present therein, and ripening the lower fatty acid ester produced to the desired solubility characteristics in at least four stages, additional neutralizing agent being added in at least the first of the ripening stages to further reduce the amount of catalyst and water being added in all of the stages of ripening, the temperature of the final ripening stage being higher than the temperature of the prior ripening stages.

7. Process for the preparation of cellulose acetate of increased stability, which comprises acetylating cellulose by means of acetic anhydride in the presence of acetic acid as solvent and sulfuric acid as catalyst, adding a neutralizing agent, selected from the group consisting of magnesium, calcium, zinc and aluminum compounds, to the acetylation mixture to reduce the amount of sulfuric acid present therein and ripening the cellulose acetate produced to the desired solubility characteristics in at least four stages, additional neutralizing agent being added in at least the first of the ripening stages to further reduce the amount of sulfuric acid, and water being added in all of the stages of ripening.

8. Process for the preparation of cellulose acetate of increased stability, which comprises acetylating cellulose by means of acetic anhydride in the presence of acetic acid as solvent and sulfuric acid as catalyst, adding a neutralizing agent, selected from the group consisting of magnesium, calcium, zinc and aluminum compounds, to the acetylation mixture to reduce the amount of sulfuric acid present therein and ripening the cellulose acetate produced to the desired solubility characteristics in at least four stages, additional neutralizing agent being added in at least the first of the ripening stages to further reduce the amount of sulfuric acid, and water being added in all of the stages of ripening, the temperature of the final ripening stage being higher than the temperature of the prior ripening stages.

9. Process for the preparation of cellulose acetate of increased stability, which comprises acetylating cellulose by means of acetic anhydride in the presence of acetic acid as solvent and from 9 to 20%, based on the weight of the cellulose, of sulfuric acid as catalyst, adding a neutralizing agent, consisting of a mixture of magnesium acetate and calcium acetate, to the acetylation mixture at the completion of the acetylation to reduce the amount of sulfuric acid present to from 7 to 10% on the weight of the cellulose originally present, adding from 20 to 35%, based on the weight of the cellulose originally present, of water, allowing the cellulose acetate to ripen at a temperature of from 40 to 45° C. for from 1 to 4 hours, adding additional neutralizing agent to reduce the sulfuric acid present to ½ to 2%, adding 50 to 100% of water, allowing the cellulose acetate to ripen further at a temperature of from 55 to 65° C. for from 1 to 4 hours, adding 50 to 1000% of water, allowing the cellulose acetate to ripen for from 1 to 4 hours at a temperature of from 60 to 90° C., again adding 50 to 100% of water and allowing the cellulose acetate to ripen to the desired degree of acetylation at a temperature of from 70 to 100° C.

CAMILLE DREYFUS.
MERVIN E. MARTIN.

CERTIFICATE OF CORRECTION.

Patent No. 2,329,706. September 31, 1943.

CAMILLE DREYFUS, ET AL.

It is hereby certified that error appears in the printed specification of the above numbered patent requiring correction as follows: Page 4, second column, line 51, claim 9, for "1000%" read --100%--; and that the said Letters Patent should be read with this correction therein that the same may conform to the record of the case in the Patent Office.

Signed and sealed this 9th day of November, A. D. 1943.

(Seal)

Henry Van Arsdale,
Acting Commissioner of Patents.